Jan. 10, 1967  C. R. JOHNSON  3,296,734
FISH LURE
Filed Oct. 1, 1964
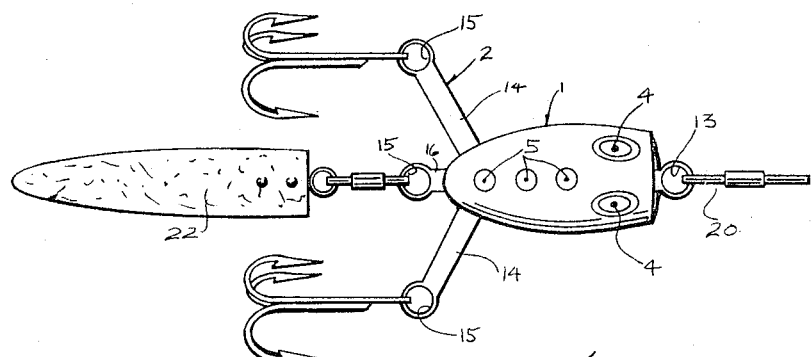
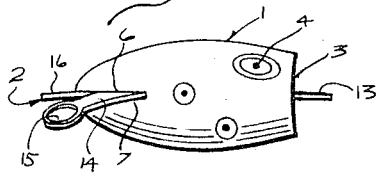
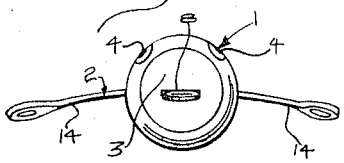
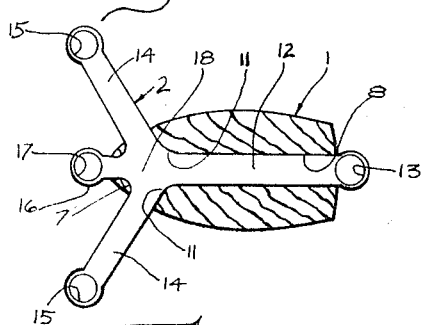
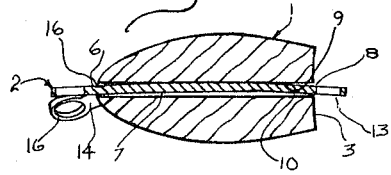
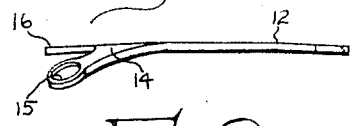
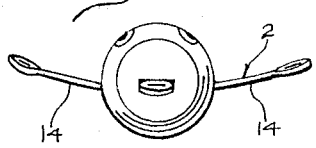
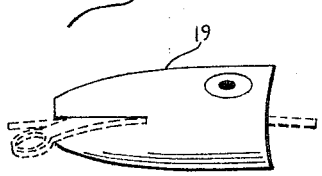
INVENTOR.
Clarence R. Johnson
BY
Charles S. Penfold

United States Patent Office 3,296,734
Patented Jan. 10, 1967

3,296,734
FISH LURE
Clarence R. Johnson, 1248 Montana St.,
Gary, Ind. 46403
Filed Oct. 1, 1964, Ser. No. 400,761
2 Claims. (Cl. 43—42.09)

The subject invention relates generally to fishing tackle and more particularly is directed to an artificial lure.

One of the principal objects of the invention is to provide a setup or organization whereby components may be assembled in various combinations to provide different styles or forms of lures. More particularly, an object is to provide an arrangement in which an insert for supporting hook structure may be operatively assembled with different bodies whereby different styles of lures may be readily obtained.

A significant objective of the invention is to provide a lure of the above character which offers advantages with respect to manufacture, speed of assembly and disassembly of the insert with different bodies, efficiency in use, and durability.

Another object of the invention is to provide a lure comprising a body provided with a forwardly extending elongate axial aperture and a rear recess communicating with the aperture, and an insert having an elongate portion extending through the aperture and a pair of divergent legs disposed in the recess and extending laterally and rearwardly of the body, with hooks carried by the legs, and the elongate portion and/or legs so shaped that the insert is held under stress in a relatively tight frictional or binding engagement with opposed internal surfaces of the axial aperture and recess.

A further object of the invention is to provide an insert which may be connected to a body in either of two operative positions.

A specific object of the invention is to provide an insert, as described above, which has an integral projection extending rearwardly between the legs and in axial alignment with the elongate portion for supporting, for example, attraction means or a hook.

Additional objects and advantages of the invention will become apparent after the description hereinafter set forth is considered in conjunction with the drawings.

In the drawings:

FIGURE 1 is a top view of the lure;

FIGURE 2 is a side elevational view of the lure, with the movable components removed therefrom;

FIGURE 3 is a front elevational view of the lure shown in FIGURE 2;

FIGURE 4 is a horizontal section taken through an appropriate part of the body of the lure;

FIGURE 5 is a vertical section taken through structure shown in FIGURE 2;

FIGURE 6 is a side elevational view of the insert of the lure;

FIGURE 7 is an end elevational view of the insert depicted in FIGURE 6;

FIGURE 8 is a front elevational view similar to FIGURE 3 showing the insert connected to a body in a reverse position; and FIGURE 9 is a side view of a different body of a lure.

Referring first to the disclosure exemplified in FIGURES 1 through 8 of the drawing, numeral 1 generally designates a body of a lure and 2 generally designates an insert adapted for assembly with the body.

The body may be made from any desirable material, such as wood or plaster, shaped and decorated as desired, but is preferably so fashioned that it represents some creature. More specifically, the body is streamlined and has a head or fore portion concaved as indicated at 3 and provided with eyes 4 and spots 5. The body, eyes and spots may be finished in any desired colors in order to promote its appearance and attraction for fish. The body also has a rear extremity provided with a horizontal recess defined in part by a pair of upper and lower parallel surfaces 6 and 7 and with an elongate forwardly extending opening 8 communicating with the recess. It will be observed that the elongate opening 8 is preferably rectangular in cross-dimensions having upper and lower parallel surfaces 9 and 10 which are spaced apart substantially the same distance as the surfaces 6 and 7. The body is further provided with a pair of corresponding abutments or stops 11 which are formed at the junction between the recess and the aperture as clearly illustrated in FIGURE 4. The recess and aperture constitute receiving means which receives the insert.

The insert 2 constituting a component of the lure may be designed and constructed in various ways but, as exemplified herein, it is preferably constructed of stainless steel and resiliently flexible in character. More specifically in this respect, the insert includes an elongate forwardly extending portion 12 having a free end provided with an aperture 13, a pair of integral corresponding divergent legs or appendages 14, the free ends of which are provided with apertures 15, and an integral projection 16 which extends rearwardly between the legs 14 and in axial alignment with the elongate portion 12. This projection is provided with an aperture 17. It will be observed that the legs extend rearwardly from the elongate portion and at oblique angles with reference to the longitudinal axis of the elongate portion.

Attention is directed to the fact that the insert is preferably made slightly concavo-convex in form or shape so that the elongate portion and legs are each slightly arched, curved or bowed.

As pointed out above, one of the objects of the invention is to provide an expeditious mode whereby the insert may be readily assembled with different forms or shapes of lure bodies. More specifically in this respect, assembly may be readily effected by merely inserting the elongate portion 12 forwardly in the longitudinal opening 8 in the lure body to cause forward edge portions of the legs 14 at the junction 18 between the legs and the elongate portion to engage the internal abutments 11 so as to locate the fore end of the elongate portion and the aperture 13 therein in a position in front of the lure body and inner portions of the legs and the projection are housed in the recess whereby major portions of the legs will project laterally and rearwardly of the lure body, and the rear end of the projection will be located to the rear of the lure.

Due to the concavo-convex character of the insert or the bowed or arched shapes of the elongate portion and legs, the insert may be caused to engage internal surfaces of the lure at balanced locations. More specifically in this respect, and as illustrated in FIGURE 5, a bottom surface of the elongate portion 12 will engage the lower surface 10 of the opening 8 and portions of the legs 14 the lower surface 7 of the recess at longitudinally spaced locations and its upper surface will engage the upper surface 9 of the opening at a location between the longitudinally spaced locations. In other words, the insert forcibly engages upper and lower surfaces of the receiving means at three spaced locations to promote stability and balance. The organization is also such that the upper convex surface of the junction 18 and/or the legs and projection may engage the upper parallel surface 6 of the recess.

In view of the shape of the insert and the internal character of the opening and the recess constituting the receiving means in the body, the insert may be readily cammed into a relatively tight frictional or binding connection with the lure body. Otherwise expressed, the insert is normally sufficiently held assembled with the lure body until it is desired to remove the insert for connection with a different type of a body such as the body 19 illustrated in FIGURE 9 of the drawing.

When the insert is correctly assembled with a body in one way, the legs will assume generally curved downwardly extending positions so as to simulate appendages or the legs of a creature. When the insert is reversibly assembled with the body in a different way, the legs will be upturned as depicted in FIGURE 8, in which event those portions of the insert engaging the opposed surfaces of the recess and opening in the body as shown in FIGURE 5 will be reversed. It may be said that the fore exposed end of the elongate portion 12 of the insert more or less resembles a nose or part of the head of a creature and that the projection more or less resembles or constitutes a tail portion.

It is to be understood that any elements may be attached to the elongate portion 12, legs 14 or projection 16 of the insert. More particularly, the opening 13 in the fore end of the elongate portion of the insert facilitates the connection of a fish line 20 thereto and the openings 15 in the free ends of the legs 14 facilitate attachment of treble hooks thereto, as exemplified in FIGURE 1. The opening 17 in the projection 16 also facilitates connection of a suitable element thereto. For example, as shown in FIGURE 1, pork rind 22 may be attached to the projection or, if desired, a bucktail or hooks may be attached thereto.

The modified form of lure body 19, illustrated in FIGURE 9 is provided with an elongate axial opening and a rear internal recess which respectively substantially correspond to to the opening and recess in the body 1 above described. In other words, the arrangement is such that the body illustrated in FIGURE 9, or any number of different bodies provided with corresponding apertures and recesses, may be utilized in conjunction with the insert.

Having thus described my invention, it is obvious that various modifications may be made in the same without departing from the spirit of the invention and, therefore, I do not wish to be understood as limiting myself to the exact forms, constructions, arrangements, and combinations of parts herein shown and described.

I claim:

1. A lure for fish, said lure comprising a body provided with a rear recess having upper and lower substantially parallel surfaces and a forwardly extending axial opening communicating with said recess, a resilient insert having a forward elongate portion curved in a vertical plane throughout its length extending through said opening and provided with means at the front of said body for connection with a line, said insert also including a pair of divergent legs curved in a vertical plane throughout their lengths and joined to said elongate portion and disposed in said recess and extending laterally and rearwardly from said body, said surfaces and the curvature of said insert providing a binding fit between said insert and said surfaces whereby to facilitate rapid assembly and disassembly between said body and insert, and hooks carried by said legs in trailing positions at the rear of said body.

2. The lure defined in claim 1, in which said insert further includes an integral projection extending rearwardly between said legs and in axial alignment with said elongate portion, and said projection being provided with means whereby to support a hook or attraction means.

References Cited by the Examiner
UNITED STATES PATENTS

| | | | |
|---|---|---|---|
| 617,236 | 1/1899 | Dougherty | 43—44.91 X |
| 2,523,831 | 9/1950 | Koski | 43—42.3 X |
| 2,618,096 | 11/1952 | Wagner | 43—42.09 X |
| 2,741,057 | 4/1956 | Morris et al. | 43—42.09 |
| 2,822,638 | 2/1958 | Warterfield | 43—42.16 |
| 3,091,884 | 6/1963 | Brownstein | 43—42.09 |

FOREIGN PATENTS

| | | |
|---|---|---|
| 897 | 1/1899 | Great Britain. |
| 26,041 | 11/1913 | Great Britain. |

SAMUEL KOREN, *Primary Examiner.*

W. H. CAMP, *Assistant Examiner.*